United States Patent

Hari et al.

Patent Number: 5,395,926
Date of Patent: Mar. 7, 1995

[54] BISAZO, BISAZOMETHINE AND AZO-AZOMETHINE COMPOUNDS DERIVED FROM 1,4-PHENYLENEDIAMINE SULFONIC ACID SALTS

[75] Inventors: Stefan Hari, Reinach; Olof Wallquist, Marly, both of Switzerland

[73] Assignee: Ciba-Geigy Corporation, Ardsley, N.Y.

[21] Appl. No.: 125,386

[22] Filed: Sep. 22, 1993

[30] Foreign Application Priority Data

Sep. 29, 1992 [CH] Switzerland .................. 3033/92

[51] Int. Cl.⁶ .................. C09B 31/14; C09B 55/00; D06P 5/06; C08K 5/00
[52] U.S. Cl. .................. 534/757; 106/496; 534/759; 544/276; 544/299
[58] Field of Search ............ 534/757, 759; 544/296, 544/279; 106/496

[56] References Cited

U.S. PATENT DOCUMENTS

| | | | |
|---|---|---|---|
| 2,216,446 | 10/1940 | McNally et al. | 534/757 X |
| 2,218,231 | 10/1940 | Dickey et al. | 534/757 X |
| 2,692,263 | 10/1954 | Taube | 534/759 X |
| 2,746,951 | 5/1956 | Taube | 534/757 X |
| 3,619,112 | 11/1971 | Berrie et al. | 534/757 X |
| 3,959,250 | 5/1976 | Heinrich et al. | 534/757 X |

FOREIGN PATENT DOCUMENTS

| | | | |
|---|---|---|---|
| 519122 | 1/1976 | Japan | 534/757 |
| 57-46246 | 3/1982 | Japan | 534/757 |
| 1-275663 | 11/1989 | Japan | 534/757 |
| 1348977 | 3/1974 | United Kingdom | 534/757 |

*Primary Examiner*—Floyd D. Higel
*Attorney, Agent, or Firm*—Michele A. Kovaleski

[57] ABSTRACT

Compounds of formula

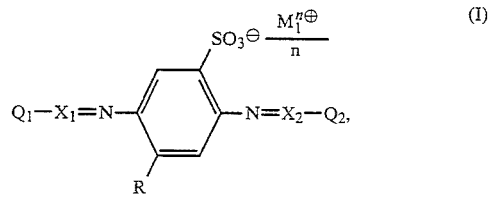

(I)

wherein R is hydrogen or a group

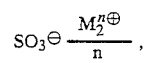

$M_1$ and $M_2$ are each independently of the other an alkali metal or alkaline earth metal or aluminum or a group of formula

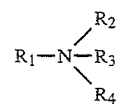

wherein n is 1, 2 or 3, and $R_1$, $R_2$, $R_3$ and $R_4$ are hydrogen or $C_1$-$C_8$alkyl,
$X_1$ and $X_2$ are each independently of the other —N= or —CH=,
$Q_1$ and $Q_2$ are each independently of the other radicals of formula

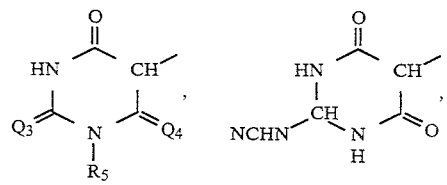

(Abstract continued on next page.)

-continued
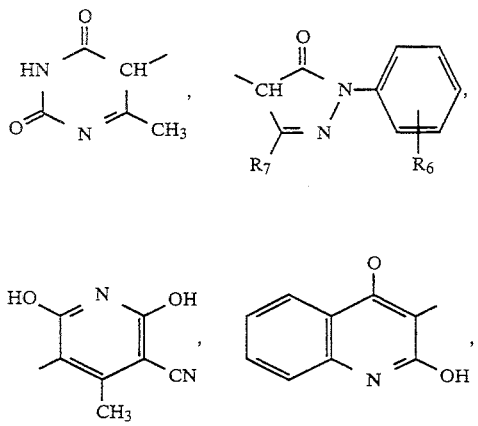
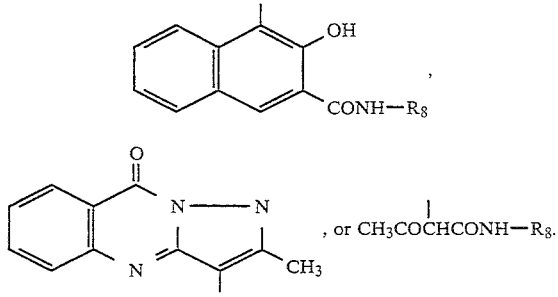
, or $CH_3COCHCONH-R_8$.
These compounds have excellent suitability for pigmenting organic material of high molecular weight, preferably polyolefins, and have superior lightfastness.
8 Claims, No Drawings

BISAZO, BISAZOMETHINE AND AZO-AZOMETHINE COMPOUNDS DERIVED FROM 1,4-PHENYLENEDIAMINE SULFONIC ACID SALTS

The present invention relates to bisazo, bisazomethine and azo-azomethine compounds derived from 1,4-phenylenediaminesulfonic acid salts, and to the use thereof for pigmenting organic material of high molecular weight.

JP-A 76 9122 discloses bisazomethine pigments derived from 14-phenylenediamine which are particularly suitable for pigmenting plastic materials owing to their superior heat resistance. The lightfastness of these pigments, however, does not meet in all respects the current requirements of pigment technology.

It has now been found that corresponding bisazo, bisazomethine and azo-azomethine compounds derived from 1,4-phenylenediaminesulfonic acid salts exhibit a very suprisingly enhanced lightfastness without other properties being impaired.

Accordingly, the invention relates to compounds of formula

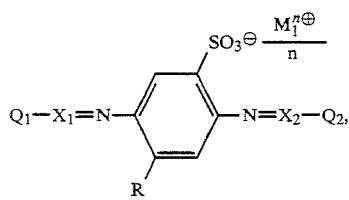
(I)

wherein R is hydrogen or a group

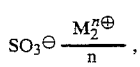

$M_1$ and $M_2$ are each independently of the other an alkali metal or alkaline earth metal or aluminium or a group of formula

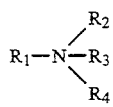

wherein n is 1, 2 or 3, and $R_1$, $R_2$, $R_3$ and $R_4$ are hydrogen or $C_1$–$C_8$alkyl, $X_1$ and $X_2$ are each independently of the other —N= or CH=, $Q_1$ and $Q_2$ are each independently of the other radicals of formula

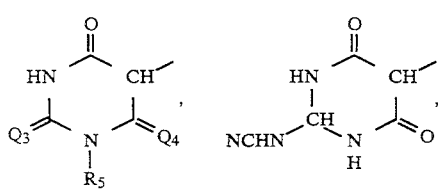

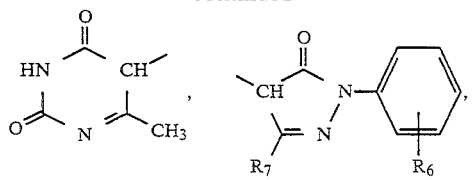

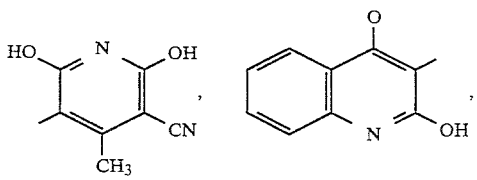

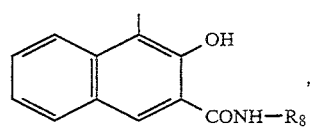

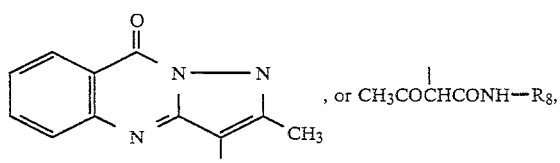

wherein $Q_3$ is O, S or NH and $Q_4$ is O or NH, $R_5$ is hydrogen, $C_1$–$C_{12}$alkyl, unsubstituted or $C_1$–$C_4$alkyl-substituted phenyl, $R_6$ is hydrogen, $C_1$–$C_4$alkyl, $C_1$–$C_4$alkoxy or

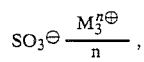

wherein $M_3$ independently of $M_1$ and $M_2$ has the same meaning, $R_7$ is OH, $C_1$–$C_4$alkyl or COOR$_9$, wherein $R_9$ is $C_1$–$C_4$alkyl, and $R_8$ is phenyl or naphthyl, unsubstituted or substituted by one or two members of the group consisting of halogen, $C_1$–$C_4$alkyl, $C_1$–$C_4$alkoxy, NO$_2$ or

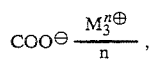

or is an unsubstituted or $C_1$–$C_4$alkyl-substituted heterocyclic radical selected from pyrrolyl, pyridyl, pyrazinyl, indolyl, quinolyl, benzimidazolyl, benzoxazolyl, phenmorpholyl, quinazolyl or quinoxalyl.

$C_1$–$C_4$Alkyl is typically methyl, ethyl, n-propyl, isopropyl, n-butyl, sec-butyl or tert-butyl.

$C_1$–$C_8$Alkyl may also be n-amyl, tert-amyl, hexyl, heptyl, octyl, 2-ethylhexyl; and $C_1$–$C_{12}$alkyl may also typically be nonyl, decyl or dodecyl.

$R_6$, $R_{10}$ and $R_{11}$ defined as $C_1$–$C_4$alkoxy is typically methoxy, ethoxy, n-propoxy, isopropoxy or butoxy.

$R_{10}$ and $R_{11}$ defined as halogen will typically be iodo, fluoro, preferably bromo and, most preferably, chloro.

Compounds of special importance are compounds of formula I, wherein $X_1$ and $X_2$ are identical and have the meanings assigned to them above, $Q_1$ and $Q_2$ are identical and are radicals of formula

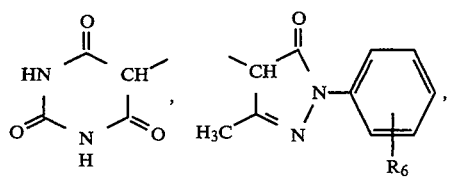

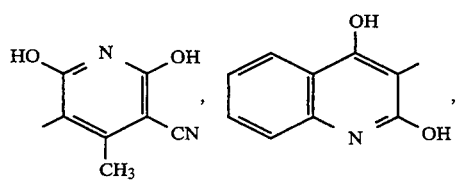

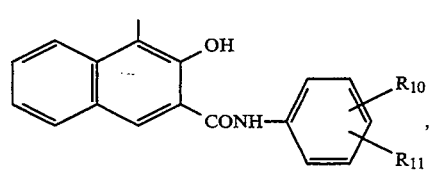

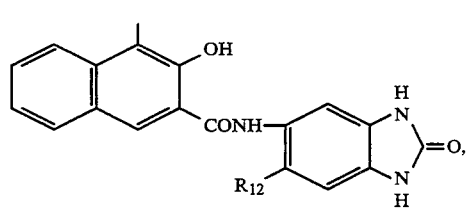

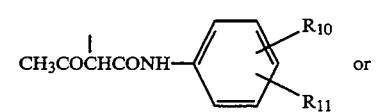

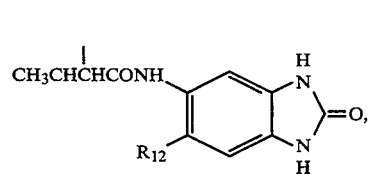

wherein $R_6$ is hydrogen, $CH_3$ or

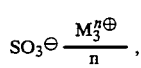

$R_{10}$ and $R_{11}$ are each independently of the other hydrogen, chloro, $CH_3$, $OCH_3$, $NO_2$ or

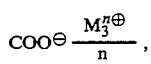

and $R_{12}$ is hydrogen or $CH_3$, and

R, $M_1$, $M_2$ and n are as defined above.

Compounds of very particular interest are compounds of formual I, wherein $X_1$ and $X_2$ are identical and are $-CH=$, $Q_1$ and $Q_2$ are identical and are radicals of formula

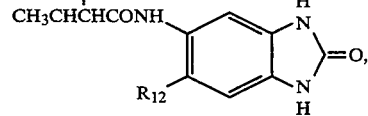

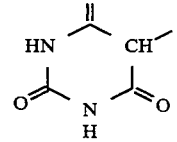

Among the radicals $Q_1$ und $Q_2$, that of formula

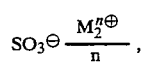

is preferred.

R is preferably a group $$SO_3^\ominus \frac{M_2^{n\oplus}}{n},$$

$M_1$, $M_2$ and $M_3$ are preferably identical and preferably Ca.

The compounds of formula I can be prepared by condensation respectively by diazotisation and coupling by standard known methods, typically in accordance with the following scheme

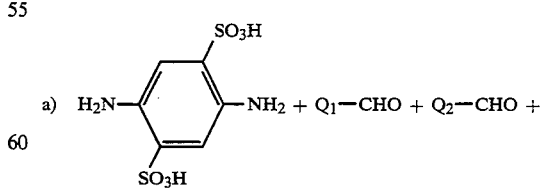

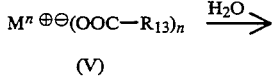

-continued

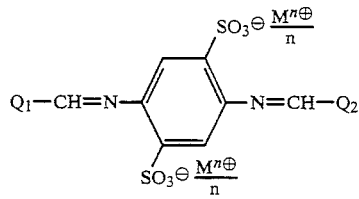

b) 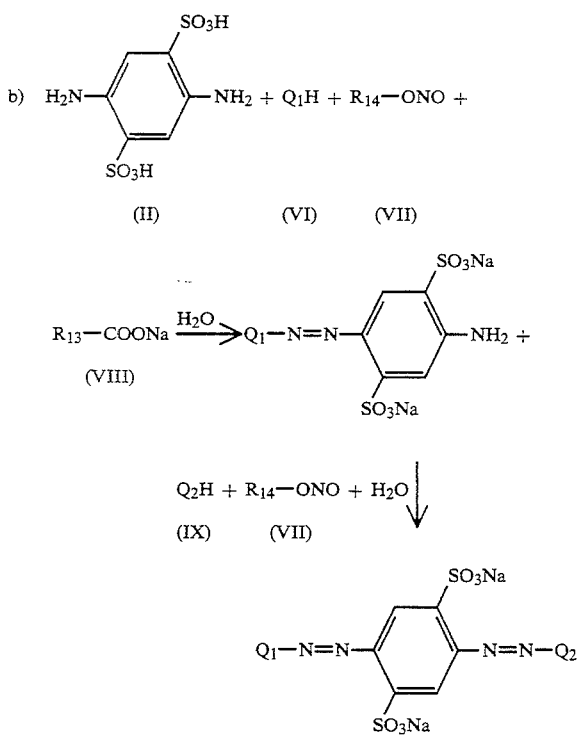

if desired, the resultant compound can be converted by replacement of Na by conventional methods into the $M^{n\oplus}$ salt c) 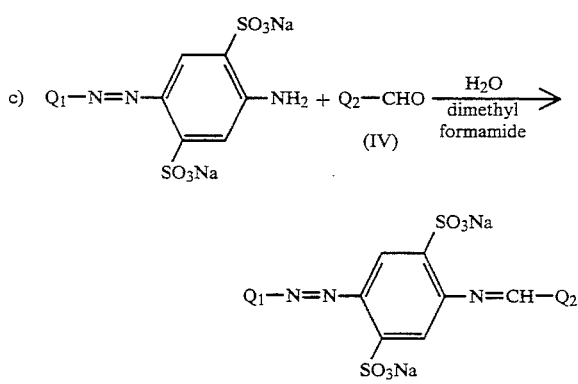

if desired, the resultant compound can be converted by replacement of Na by conventional methods into the $M^{n\oplus}$ salt The compounds of formulae II to IX are known compounds. Any that may be novel can be prepared by methods analogous to those for preparing known compounds. In formulae II to IX, $Q_1$ and $Q_2$ are as defined above, $M^{n\oplus}$ is $M_1{}^{n\oplus}$ and/or $M_2{}^{n\oplus}$ as defined above, and $R_{13}$ and $R_{14}$ are each independently of other $C_1$-$C_4$alkyl.

The novel compounds have excellent suitability as pigments for colouring organic material of high molecular weight.

Illustrative examples of organic materials of high molecular weight which can be coloured with the pigments of this invention are cellulose ethers and esters, typically including ethyl cellulose, nitrocellulose, cellulose acetate, cellulose butyrate, natural resins or synthetic resins, typically polymerization or condensation resins such as aminoplasts, preferably urea/formaldehyde and melamine/formaldehyde resins, alkyd resins, phenolic plastics, polycarbonates, polyolefins, polystyrene, polyvinyl chloride, polyamides, polyurethanes, polyesters, ABS, polyphenylene oxides, rubber, casein, silicone and silicone resins, singly or in mixtures.

The pigments of this invention are especially suitable for colouring polyvinyl chloride and, preferably, polyolefins such as polyethylene and polypropylene.

The above high molecular weight organic compounds may be singly or as mixtures in the form of plastics, melts or of spinning solutions, paints, coating materials or printing inks. Depending on the end use requirement, it is expedient to use the pigments of the invention as toners or in the form of preparations.

The pigments of the invention can be used in an amount of 0.01 to 30% by weight, preferably 0.1 to 10% by weight, based on the high molecular weight organic material.

The pigmenting of the high molecular weight organic materials with the pigments of this invention is conveniently effected by incorporating the pigments by themselves or in the form of masterbatches in the substrates using roll mills, mixing or milling apparatus. The pigmented material is then brought into the desired final form by methods which are known per se, conveniently by calendering, moulding, extruding, coating, spinning, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated before or after working the pigments into the polymers. To obtain different shades it is also possible to add fillers or other chromophoric components such as white, coloured or black pigments in any amount to the high molecular weight organic materials.

For pigmenting paints, coating materials and printing inks, the high molecular weight organic materials and the pigments of the invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

When used for colouring e.g. polyvinyl chloride or polyolefins, the pigments of this invention have good general pigment properties, such as good dispersibility, high colour strength and purity, as well as excellent fastness to migration, heat, light and weathering, as well as good hiding power and, most especially, superior lightfastness.

The invention is illustrated by the following Examples.

Example 1

3.2 g of barbituraldehyde, 2.7 g of 1,4-phenylenediamine-2,5-disulfonic acid and 1.8 g of anhydrous calcium acetate are heated in 150 ml of water to 79° C. The dense yellow suspension that forms is stirred for 40 minutes at this temperature. The product is then isolated hot by suction filtration, washed with 100 ml of water and vacuum dried at 60° C. The yield is 5.85 g (91.9% of theory). The pigment has the formula

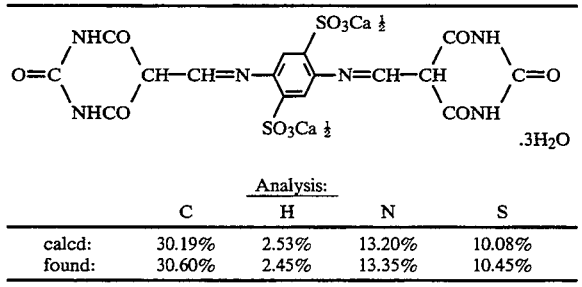

| Analysis: | | | | |
|---|---|---|---|---|
| | C | H | N | S |
| calcd: | 30.19% | 2.53% | 13.20% | 10.08% |
| found: | 30.60% | 2.45% | 13.35% | 10.45% |

The product of this Example colours polyvinyl chloride in greenish yellow shades of excellent lightfastness. It does not migrate. When incorporated in polypropylene, the product is distinguished by superior heat-resistance and lightfastness.

The following Table 1 lists further pigments which can be prepared by the process of this Example by condensing the aldehyde of the coupling components indicated in column I with the diamine derivatives of column II in the presence of the metal salts listed in column III. Column IV indicates the shade of polyvinyl chloride coloured with the resultant pigment.

are stirred for 5 minutes in 90 ml of distilled water and 10 ml of acetic acid. To the suspension is added 0.66 ml of 90% tert-butylnitrite and the reaction mixture is stirred for a further 1 hour at room temperature. After c. 15 minutes a clear brown solution forms. A beige-coloured precipitate (diazo compound) falls out of the solution afterwards. Meanwhile, 0.65 g of barbituric acid and 7.2 g of sodium hydoxide are dissolved in 80 ml of water. The clear, pale yellow solution is poured over 2 minutes into the diazo suspension. The resultant red suspension is heated to 80° C., stirred for 30 minutes at this temperature, cooled to 40° C. and filtered with suction. The filter product is washed with 100 ml of ethanol and vacuum dried at 60° C., giving 2.7 g (91.5% of theory) of an orange powder of formula

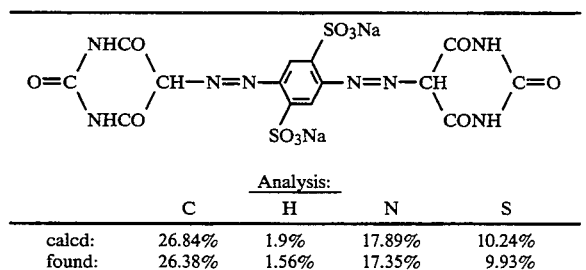

| Analysis: | | | | |
|---|---|---|---|---|
| | C | H | N | S |
| calcd: | 26.84% | 1.9% | 17.89% | 10.24% |
| found: | 26.38% | 1.56% | 17.35% | 9.93% |

This product colours polyethylene, polypropylene and polyvinyl chloride in strong orange shades of excellent heat-resistance and lightfastness. The starting amine (X) can be prepared as follows:

17 g of 1,4-phenylenediamine-2,5-disulfonic acid, 80%, are stirred in 500 ml of deionised water for 5 minutes. To the grey suspension are added 13.25 ml of

TABLE 1

| Ex. | I | II | III | IV |
|---|---|---|---|---|
| 2 | barbituric acid | 2,5-diaminobenzene sulfonic acid | calcium acetate | greenish yellow |
| 3 | barbituric acid | 1,4-phenylenediamine-2,5-disulfonic acid | ammonium acetate | greenish yellow |
| 4 | barbituric acid | 1,4-phenylenediamine-2,5-disulfonic acid | sodium acetate | greenish yellow |
| 5 | barbituric acid | 1,4-phenylenediamine-2,5-disulfonic acid | potassium acetate | greenish yellow |
| 6 | barbituric acid | 1,4-phenylenediamine-2,5-disulfonic acid | strontium chloride hexahydrate | greenish yellow |
| 7 | barbituric acid | 1,4-phenylenediamine-2,5-disulfonic acid | barium acetate | greenish yellow |
| 8 | 1-ethyl-6-hydroxy-3-cyano-4-methyl-2-pyridone | 1,4-phenylenediamine-2,5-disulfonic acid | calcium acetate | yellow |
| 9 | 2-thiobarbituric acid | 1,4-phenylenediamine-2,5-disulfonic acid | calcium acetate | orange |
| 10 | 1-methyl-4-hydroxy-2-quinolone | 1,4-phenylenediamine-2,5-disulfonic acid | calcium acetate | greenish yellow |
| 11 | 1-phenyl-3-methyl-5-pyrazolone | 1,4-phenylenediamine-2,5-disulfonic acid | calcium acetate | greenish yellow |

EXAMPLE 12

2.35 g of the amine of formula

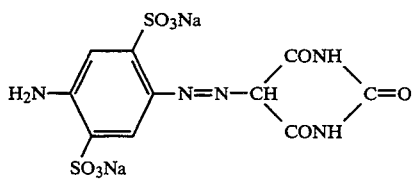

(X)

90% tert-butylnitrite, and the reaction mixture is stirred for 1 hour at room temperature. A clear, dark brown solution forms after 5 minutes. To the diazo solution are then added, in succession, 13 g of barbituric acid and a solution of 40 g of anhydrous sodium acetate in 500 ml of deionised water. The reaction mixture is heated to 74° C. The resultant dark brown solution is stirred for 20 minutes at this temperature and 250 g of sodium chloride are added, whereupon a red precipitate forms. The red suspension is cooled to 45° C. and filtered. The red rod-shaped product is washed with a little water and with 100 ml of ethanol and vacuum dried at 60° C., giving 20 g (85.25% of theory) of a poppy-red powder of formula X.

| | Analysis: | | | |
|---|---|---|---|---|
| | C | H | N | S |
| calcd: | 25.59% | 1.94% | 14.91% | 13.66% |
| found: | 25.15% | 1.85% | 14.55% | 13.15% |

Table 2 contains further pigments which can be prepared by the process of Example 12 by diazotising 1,4-phenylenediamine-2,5-disulfonic acid in water with tert-butylnitrite and coupling the diazo compound with the coupling component indicated in column I. The azo dyestuff amine is isolated and likewise diazotised in water with tert-butylnitrite. Finally, the novel diazo compound is coupled with the coupling component listed in column II. Column III indicates the shade of polyvinyl chloride coloured with the novel disazo pigment. The products are in the form of the disodium salt.

TABLE 2

| Ex. | I | II | III |
|---|---|---|---|
| 13 | 2,6-dihydroxy-3-cyano-4-methylpyridine | 2,6-dihydroxy-3-cyano-4-methylpyridine | violet |
| 14 | 5-acetoacetylaminobenzimidazolone | 5-acetoacetylaminobenzimidazolone | yellow |
| 15 | barbituric acid | 2-thiobarbituric acid | bordeaux |
| 16 | barbituric acid | 2-hydroxy-3-naphthanilide | brown violet |
| 17 | barbituric acid | 5-acetoacetylaminobenzimidazolone | red |
| 18 | barbituric acid | 2,6-dihydroxy-3-cyano-4-methylpyridine | bordeaux |
| 19 | 1-phenyl-3-methylpyrazolone | 1-phenyl-3-methylpyrazolone | scarlet |
| 20 | 5-acetoacetylaminobenzimidazolone | 1-phenyl-3-methylpyrazolone | red |
| 21 | barbituric acid | 2-acetoacetylaminotoluene | orange |
| 22 | barbituric acid | 2-acetoacetylaminoanisole | orange |
| 23 | barbituric acid | acetoacetanilide | brown orange |
| 24 | barbituric acid | 7-acetoacetylamino-2-hydroxy-4-methylquinoline | red orange |
| 25 | barbituric acid | 4-acetoacetylaminoacetanilide | red orange |
| 26 | barbituric acid | 2-acetoacetylamino-6-methoxybenzthiazole | red orange |
| 27 | barbituric acid | (2-methoxy)-2-hydroxy-3-naphthanilide | violet |
| 28 | barbituric acid | 1-acetoacetylaminonaphthalene | brown orange |
| 29 | barbituric acid | 5-methyl-6-(2-hydroxy-3-naphthoylamino)benzimidazolone | blue |
| 30 | barbituric acid | 1,3-dimethylbarbituric acid | orange |
| 31 | barbituric acid | 2-cyaniminobarbituric acid | red orange |
| 32 | barbituric acid | 2-iminobarbituric acid | red |
| Ex. | I | II | III |
| 33 | barbituric acid | 1-(4-methylphenyl)-3-methyl-pyrazolone | red orange |
| 34 | barbituric acid | 4-iminobarbituric acid | brown |
| 35 | barbituric acid | 2,4-dihydroxy-6-methylpyridine | red |
| 36 | barbituric acid | 1-ethyl-2,6-dihydroxy-3-cyano-4-methyl-pyridine | red brown |
| 37 | barbituric acid | 2,6-dihydroxy-4-methylpyridine-3-carboxamide | brown red |
| 38 | barbituric acid | 1-butyl-2,6-dihydroxy-3-cyano-4-methylpyridine | brown orange |
| 39 | barbituric acid | 3-methylpyrazolone | red |
| 40 | barbituric acid | 4-hydroxycoumarin | red orange |
| 41 | 2-iminobarbituric acid | 2-iminobarbituric acid | red |
| 42 | 2-iminobarbituric acid | acetoacetanilide | brown orange |
| 43 | 2-iminobarbituric acid | 2,6-dihydroxy-3-cyano-4-methylpyridine | violet |
| 44 | 2-iminobarbituric acid | 2-acetoacetylamino-6-methoxy-benzothiazole | orange |
| 45 | 2-iminobarbituric acid | 1-phenyl-3-methylpyrazolone | orange |
| 46 | 2-iminobarbituric acid | 2-cyaniminobarbituric acid | orange red |
| 47 | 2-iminobarbituric acid | 2,4-dihydroxy-5-methylpyridine | violet red |
| 48 | 2-iminobarbituric acid | 3-methylpyrazolone | orange red |
| 49 | 2-acetoacetylaminoanisole | 2-acetoacetylamino-6-methoxy-benzothiazole | orange |
| 50 | 2-acetoacetylaminoanisole | 1-phenyl-4-methylpyrazolone | orange |
| 51 | 2-acetoacetylaminoanisole | 2-cyaniminobarbituric acid | orange |
| 52 | 2-acetoacetylamino-6-methoxybenzothiazole | 2-acetoacetylamino-6-methoxy-benzothiazole | orange |
| 53 | 5-acetoacetylaminobenzimidazolone | 2-cyaniminobarbituric acid | orange red |
| 54 | 1-phenyl-3-methylpyrazolone | 2-cyaniminobarbituric acid | red orange |
| 55 | 2-cyaniminobarbituric acid | 2-cyaniminobarbituric acid | orange red |

EXAMPLE 56

3.2 g of the disodium salt of formula

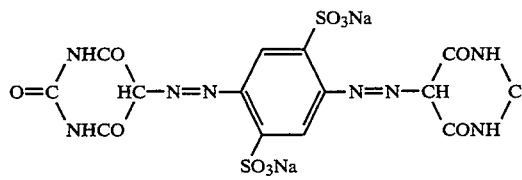

(Ex. 15) and 1.1 g of anhydrous calcium chloride are heated in 80 ml of deionised water and 10 ml of alcohol to 78° C. The dark red suspension is stirred for 1 hour at this temperature and filtered warm through a suction filter. The filter product is washed with ml of water and vacuum dried at 60° C., giving 1.2 g (89% of theory) of a dark red powder of formula

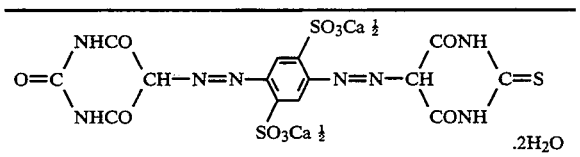

Analysis:

| | C | H | N | S | Ca |
|---|---|---|---|---|---|
| calcd: | 26.41% | 1.90% | 17.61% | 15.10% | 6.30% |
| found: | 26.0% | 2.3% | 17.12% | 14.7% | 5.9% |

This product colours polyvinyl chloride in bordeaux shades of good fastness to migration, light and heat. All disodium salts can be converted into the calcium salts in similar manner.

EXAMPLE 57

2.35 g of the amine of formula X (cf. Example 2) is heated in 100 ml of distilled water to 50° C. A clear brown red solution forms. Meanwhile, 0.95 g of barbituraldehyde is dissolved in 50 ml of dimethyl formamide at room temperature. The clear yellow solution is poured, with stirring, into the amine solution, whereupon an orange precipitate forms. The orange suspension is stirred for 15 minutes at 60° C. and then for 10 minutes at 80° C. The product is filtered with suction at 50° C. The filter product is washed with 100 ml of ethanol and vacuum dried at 60° C., giving 2.8 g (90.4 % of theory) of an orange powder of formula

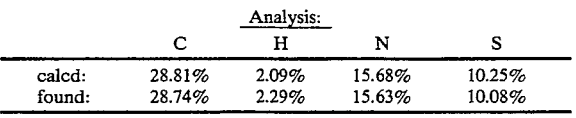

Analysis:

| | C | H | N | S |
|---|---|---|---|---|
| calcd: | 28.81% | 2.09% | 15.68% | 10.25% |
| found: | 28.74% | 2.29% | 15.63% | 10.08% |

This product colours polyvinyl chloride in orange shades of excellent fastness to migration, light and heat.

The following Table 3 contains further pigments which can be prepared by the process of Example 57 by dissolving the azoamine obtained from 1,4-phenylenediamine-2,5-disulfonic acid and the coupling component of column 1 in water at c. 50° C. and reacting the resultant solution with a solution of the aldehyde of the coupling component listed in column II in dimethyl formamide. Column III indicates the shade of polyvinyl chloride coloured with the novel azine-azo pigment.

TABLE 3

| Ex. | I | II | III |
|---|---|---|---|
| 58 | barbituric acid | 1-phenyl-3-methyl-5-pyrazolone | orange |
| 59 | barbituric acid | 2,6-dihydroxy-3-cyano-4-methyl-pyridine | orange |
| 60 | barbituric acid | 2-thiobarbituric acid | orange |
| 61 | barbituric acid | 1-methyl-2,6-dihydroxy-3-cyano-4-methylpyridine | orange |
| 62 | 1-phenyl-3-methyl-5-pyrazolone | barbituric acid | ochre |
| 63 | 1-phenyl-3-methyl-5-pyrazolone | 2-thiobarbituric acid | orange |
| 64 | 1-phenyl-3-methyl-5-pyrazolone | 2,6-dihydroxy-3-cyano-4-methyl-pyridine | orange |
| 65 | 1-phenyl-3-methyl-5-pyrazolone | 1-phenyl-3-methyl-5-pyrazolone | red orange |
| 66 | 1-phenyl-3-methyl-5-pyrazolone | 1-methyl-2,6-dihydroxy-3-cyano-4-methylpyridine | yellow |
| 67 | 2-imino-barbituric acid | barbituric acid | orange |
| 68 | 2-imino-barbituric acid | 2-thiobarbituric acid | red orange |
| 69 | 2-methoxyacetoacetylamino-benzene | barbituric acid | yellow |
| 70 | 2-acetoacetylamino-5-benzimidazolone | barbituric acid | yellow |

What is claimed is:

1. A compound of formula

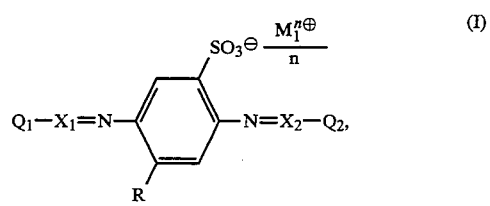

wherein R is hydrogen or a group

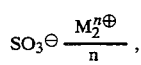

$M_1$ and $M_2$ are each independently of the other an alkali metal or alkaline earth metal or aluminium or a group of formula

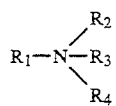

wherein n is 1, 2 or 3, and $R_1$, $R_2$, $R_3$ and $R_4$ are hydrogen or $C_1$–$C_8$alkyl, $X_1$ and $X_2$ are each independently of the other —N= or —CH=, $Q_1$ and $Q_2$ are each independently of the other radicals of formula

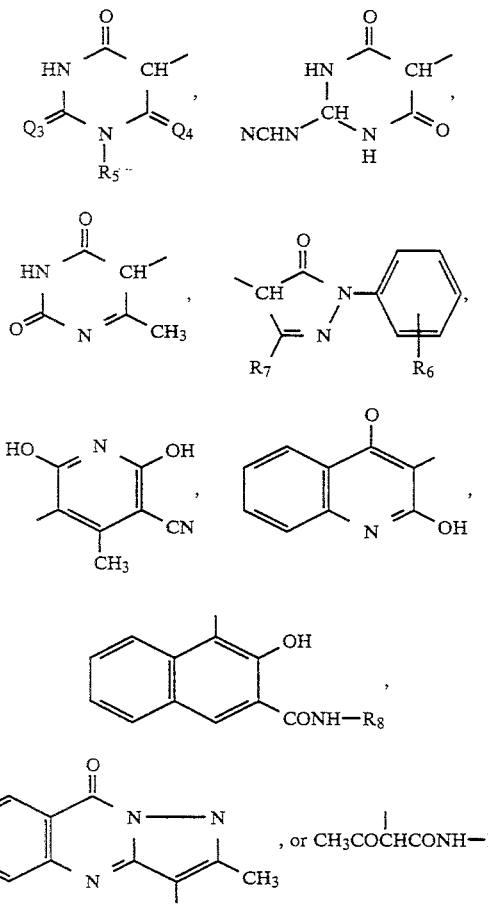

wherein $Q_3$ is O, S or NH and $Q_4$ is O or NH, $R_5$ is hydrogen, $C_1$–$C_{12}$alkyl, unsubstituted or $C_1$–$C_4$alkyl-substituted phenyl, $R_6$ is hydrogen, $C_1$–$C_4$alkyl, $C_1$–$C_4$alkoxy or

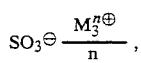

wherein $M_3$ independently of $M_1$ and $M_2$ has the same meaning, $R_7$ is OH, $C_1$–$C_4$alkyl or $COOR_9$, wherein $R_9$ is $C_1$–$C_4$alkyl, and $R_8$ is phenyl or naphthyl, unsubstituted or substituted by one or two members of the group consisting of halogen, $C_1$–$C_4$alkyl, $C_1$–$C_4$alkoxy, $NO_2$ or

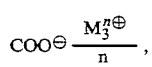

or is an unsubstituted or $C_1$–$C_4$alkyl-substituted heterocyclic radical selected from pyrrolyl, pyridyl, pyrazinyl, indolyl, quinolyl, benzimidazolyl, benzoxazolyl, phenmorpholyl, quinazolyl or quinoxalyl.

2. A compound of formula I according to claim 1, wherein $X_1$ and $X_2$ are identical, $Q_1$ and $Q_2$ are identical and are radicals of formula

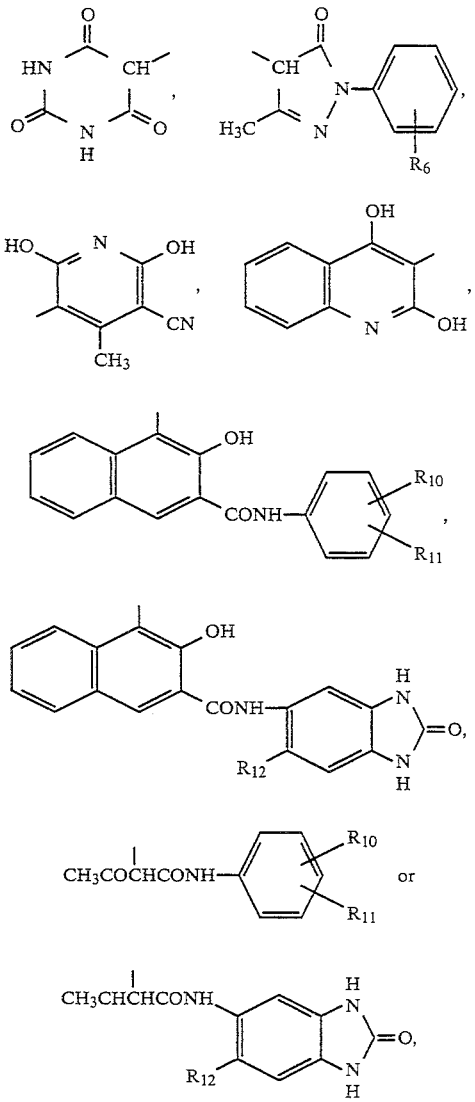

wherein $R_6$ is hydrogen, $CH_3$ or

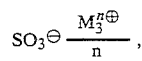

$R_{10}$ and $R_{11}$ are each independently of the other hydrogen, chloro, $CH_3$, $OCH_3$, $NO_2$, or

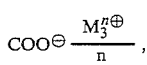

and $R_{12}$ is hydrogen or $CH_3$.

3. A compound of formula I according to claim 1, wherein $X_1$ and $X_2$ are identical and are —CH=, $Q_1$ and $Q_2$ are identical and are radicals of formula

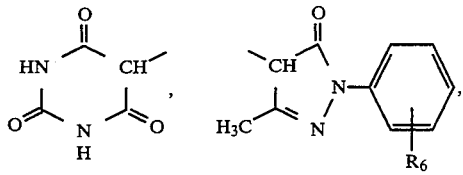

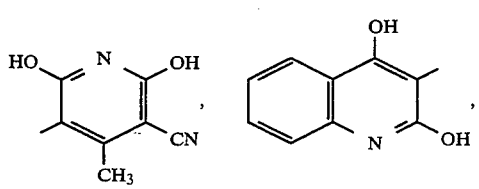

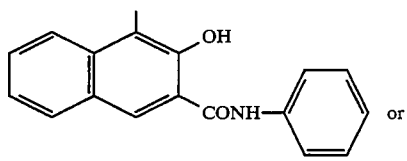 or

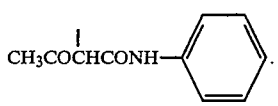

4. A compound according to claim 3, wherein $Q_1$ and $Q_2$, are the radical of formula

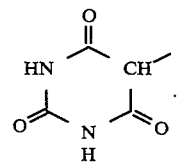

5. A compound of formula I according to claim 1, wherein R is a group

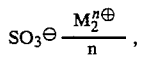

and $M_1$, $M_2$ and $M_3$ are identical.

6. A compound according to claim 5, wherein $M_1$, $M_2$ and $M_3$ are Ca.

7. Organic material of high molecular weight pigmented with a compound of formula I.

8. Organic material of high molecular weight according to claim 7, which is a polyolefin.

* * * * *